(12) United States Patent
Sahagen

(10) Patent No.: US 11,049,203 B2
(45) Date of Patent: Jun. 29, 2021

(54) SYSTEM AND METHOD FOR PROVIDING AUTOMATED REAL ESTATE OWNERSHIP MOBILITY

(71) Applicant: Peter Dwight Sahagen, Sheridan, WY (US)

(72) Inventor: Peter Dwight Sahagen, Sheridan, WY (US)

(*) Notice: Subject to any disclaimer, the term of this patent is extended or adjusted under 35 U.S.C. 154(b) by 137 days.

(21) Appl. No.: 16/237,625

(22) Filed: Dec. 31, 2018

(65) Prior Publication Data

US 2020/0211133 A1    Jul. 2, 2020

(51) Int. Cl.
| | |
|---|---|
| *G06Q 50/16* | (2012.01) |
| *G06Q 30/04* | (2012.01) |
| *G06Q 30/02* | (2012.01) |
| *G06Q 30/06* | (2012.01) |
| *G06Q 40/06* | (2012.01) |

(52) U.S. Cl.
CPC ....... *G06Q 50/167* (2013.01); *G06Q 30/0278* (2013.01); *G06Q 30/04* (2013.01); *G06Q 30/06* (2013.01); *G06Q 40/06* (2013.01); *G06Q 50/16* (2013.01)

(58) Field of Classification Search
CPC ... G06Q 50/167; G06Q 30/0278; G06Q 30/04
See application file for complete search history.

(56) References Cited

U.S. PATENT DOCUMENTS

| | | | | |
|---|---|---|---|---|
| 6,292,788 | B1* | 9/2001 | Roberts | G06Q 40/06 705/36 T |
| 10,498,808 | B2* | 12/2019 | Purushothaman | H04L 63/0428 |
| 10,504,179 | B1* | 12/2019 | McGuire | G06Q 40/04 |
| 10,891,612 | B2* | 1/2021 | Lu | H04L 9/3263 |
| 2002/0029183 | A1* | 3/2002 | Vlahoplus | G06Q 30/06 705/37 |
| 2006/0116952 | A1 | 6/2006 | Orfano | |
| 2008/0126235 | A1* | 5/2008 | Sullivan | G06Q 40/04 705/37 |
| 2008/0154686 | A1* | 6/2008 | Vicino | G06Q 40/04 705/313 |
| 2008/0167979 | A1* | 7/2008 | Somers | G06Q 40/00 705/35 |
| 2008/0208763 | A1* | 8/2008 | Smith | G06Q 50/188 705/80 |

(Continued)

OTHER PUBLICATIONS

Ramsundar, Bharath et al. "Tokenized Data Markets." ArXiv abs/1806.00139 (2018): n. pag. (Year: 2018).*

(Continued)

*Primary Examiner* — Ashford S Hayles
(74) *Attorney, Agent, or Firm* — Ellenoff Grossman & Schole LLP; James M. Smedley; Alex Korona

(57) ABSTRACT

The present disclosure relates to methods and systems for providing automated real estate ownership mobility. More specifically embodiments of the present invention are directed to a system and method for providing users of the system to identify, select and transact in real estate without need to execute a physical sale of the underlying real estate assets. Further, embodiments of the present invention allow for transactions in fractional, defined fractional and whole portions of a real estate units, in one, two or n-way sales.

17 Claims, 4 Drawing Sheets

(56) References Cited

U.S. PATENT DOCUMENTS

| | | | | |
|---|---|---|---|---|
| 2008/0215500 A1* | 9/2008 | De La Motte | | G06Q 40/06 |
| | | | | 705/36 R |
| 2008/0222018 A1* | 9/2008 | Backer | | G06Q 40/00 |
| | | | | 705/35 |
| 2008/0249829 A1* | 10/2008 | Vicino | | G06Q 10/02 |
| | | | | 705/7.21 |
| 2008/0306879 A1* | 12/2008 | Legatz | | G06Q 40/06 |
| | | | | 705/36 R |
| 2008/0312945 A1* | 12/2008 | White | | G06Q 50/18 |
| | | | | 705/311 |
| 2009/0089198 A1* | 4/2009 | Kroutik | | G06Q 20/10 |
| | | | | 705/37 |
| 2013/0046646 A1* | 2/2013 | Malan | | G06Q 30/06 |
| | | | | 705/26.2 |
| 2013/0117156 A1* | 5/2013 | Azmi | | G06Q 40/08 |
| | | | | 705/26.35 |
| 2013/0297438 A1* | 11/2013 | Louie | | G06Q 30/08 |
| | | | | 705/26.3 |
| 2014/0164216 A1* | 6/2014 | Manjirnath | | G06Q 40/025 |
| | | | | 705/38 |
| 2015/0019362 A1* | 1/2015 | Chan | | G06F 17/18 |
| | | | | 705/26.2 |
| 2015/0199766 A1* | 7/2015 | Vilmont | | G06Q 50/16 |
| | | | | 705/36 T |
| 2017/0085545 A1* | 3/2017 | Lohe | | G06Q 20/065 |
| 2017/0213289 A1* | 7/2017 | Doney | | G06Q 40/025 |
| 2017/0232300 A1 | 8/2017 | Tran et al. | | |
| 2018/0173719 A1* | 6/2018 | Bastide | | G06F 16/13 |
| 2018/0181768 A1* | 6/2018 | Leporini | | G06F 21/31 |
| 2018/0198624 A1* | 7/2018 | Bisti | | H04L 9/0891 |
| 2018/0211313 A1* | 7/2018 | Narahari | | G06Q 40/025 |
| 2018/0218176 A1* | 8/2018 | Voorhees | | H04L 9/3213 |
| 2018/0285979 A1* | 10/2018 | Chessell | | G06Q 40/08 |
| 2018/0322597 A1* | 11/2018 | Sher | | H04L 67/22 |
| 2018/0343175 A1* | 11/2018 | Bathen | | H04L 67/10 |
| 2019/0036778 A1* | 1/2019 | Bathen | | H04L 41/0893 |
| 2019/0073729 A1* | 3/2019 | Cheng-Shorland | | |
| | | | | H04L 9/3297 |
| 2019/0114334 A1* | 4/2019 | Gunther | | G06F 16/2358 |
| 2019/0139032 A1* | 5/2019 | Heavey | | G06Q 20/065 |
| 2019/0165943 A1* | 5/2019 | Chari | | H04L 9/30 |
| 2019/0182254 A1* | 6/2019 | Christidis | | H04L 9/0637 |
| 2019/0287195 A1* | 9/2019 | Lee | | G06Q 50/167 |
| 2019/0306230 A1* | 10/2019 | Purushothaman | | G06K 7/1413 |
| 2019/0333142 A1* | 10/2019 | Thomas | | G06Q 40/025 |
| 2019/0340607 A1* | 11/2019 | Lynn | | G06Q 20/3829 |
| 2019/0355076 A1* | 11/2019 | Marcinkowski | | G06Q 40/02 |
| 2019/0370358 A1* | 12/2019 | Nation | | G06F 16/1805 |
| 2019/0377904 A1* | 12/2019 | Sinha | | H04L 9/0637 |
| 2020/0043115 A1* | 2/2020 | Nelson | | H04L 9/3239 |
| 2020/0162266 A1* | 5/2020 | Miller | | H04L 63/0861 |
| 2020/0175623 A1* | 6/2020 | Howie | | G06Q 20/389 |
| 2020/0211134 A1* | 7/2020 | Sahagen | | G06Q 30/04 |
| 2020/0234386 A1* | 7/2020 | Blackman | | H04L 9/30 |

OTHER PUBLICATIONS

S. S. Dawes, M. E. Cook and N. Helbig, "Challenges of Treating Information as a Public Resource: The Case of Parcel Data," Proceedings of the 39th Annual Hawaii International Conference on System Sciences (HICSS'06), Kauai, HI, USA, 2006, p. 81a-81a, doi: 10.1109/HICSS.2006.83. (Year: 2006).*

Peters, G. and Efstathios Panayi. "Understanding Modern Banking Ledgers Through Blockchain Technologies: Future of Transaction Processing and Smart Contracts on the Internet of Money." Information Systems & Economics eJournal (2015): n. pag. (Year: 2015).*

A. P. Amadi-Echendu and J. E. Amadi-Echendu, "A study on data and information integration for conveyancing, cadastre and land registry automation," 2016 Portland International Conference on Management of Engineering and Technology (PICMET), Honolulu, HI, 2016, pp. 804-814 (Year: 2016).*

C. Shen and F. Pena-Mora, "Blockchain for Cities—A Systematic Literature Review," in IEEE Access, vol. 6, p. 76787-76819, 2018, doi: 10.1109/ACCESS.2018.2880744. (Year: 2018).*

International Search Report and Written Opinion dated Mar. 31, 2020, issued in the counterpart PCT application of the present application.

* cited by examiner

SYSTEM AND METHOD FOR PROVIDING AUTOMATED REAL ESTATE OWNERSHIP MOBILITY

FIELD OF INVENTION

The present disclosure relates to methods and systems for providing automated real estate ownership mobility. More specifically embodiments of the present invention are directed to a system and method for providing users of the system to identify, select and transact in real estate without need to execute a physical sale of the underlying real estate assets. Further, embodiments of the present invention allow for transactions in fractional, defined fractional and whole portions of a real estate units, in one, two or n-way sales.

BACKGROUND

Due to the ever-increasing cost of real estate, more and more individuals are being excluded from the possibility of owning real estate, at least until later period in life than have been prevalent in the past. Especially in urban and prime sub-urban locations, ownership of a home or apartment is largely out of the question for most young individuals, disadvantaged (e.g., socially, economically, disabled) individuals, and even many older individuals in lower to middle wage-earning demographics.

Instead, these various groups of individuals that do not own real estate and currently have no viable means to obtain real estate, turn to renting residences, often for many years or decades. Unlike ownership in a home, where equity is built over time, rental units require a tenant to simply pay money for the residence without any gained equity in the residence. Accumulating and ever increasing rental cost, coupled with diminishing rental unit housing supply, can be debilitating for individuals worldwide, both financially and with respect to the mobility of such individuals.

Another common practice in high density population areas, like urban and sub-urban areas, is for these groups of individuals to enter into leases for rental properties with other individuals, whereby the individuals share a single rental unit. Commonly referred to in various locations as roommates, flatmates or housemates, these joint living situations are especially common among younger individuals who may not have the affluence to afford the down payments required for real estate ownership outright. As the cost of real estate continues to outpace real wage increases, this practice will be come even more common, and for longer periods of an individual's life.

Finally, given the high transaction costs associated with real estate transactions, from listing costs, to commissions agents and brokers, to title fees and attorney fees, real estate units are generally something that an individual must hold onto for a period of time in order to realize any gains. Further, real estate is generally only able to be purchased in whole units (e.g. a house, an apartment), rather than individual portions. The only way that individuals can share ownership of whole units is to have each individual listed on deed or other ownership record. In general, this makes Real estate, in the current transactional form, limited in both ownership frameworks and mobility.

Therefore, there is a need in the art for systems and methods for providing automated real estate ownership mobility in a manner that overcomes the limitations described above.

SUMMARY OF INVENTION

Accordingly, the subject matter described herein provides systems, methods, and computer-readable non-transitory storage mediums for providing automated real estate ownership mobility.

According to an embodiment of the present invention, a computerized method for providing automated real estate ownership mobility, said computerized method using a real estate mobility module, a processor and a communications means, the method comprising the steps of: receiving a real estate match request; generating a match dataset, wherein said match dataset is based at least in part on information derived from said real estate match request, and wherein said match dataset comprises information associated with at least one real estate unit; transmitting, via said communications means, said match dataset to a user; receiving a transaction request from said user; processing said transaction request, wherein said transaction request identifies a real estate unit from said match dataset; executing a change of ownership, wherein said user becomes at least partial owner of said real estate unit from said match dataset; and generating one or more smart contracts, wherein at least one of said one or more smart contracts is associated with recording a change in ownership of said real estate unit from said match dataset.

According to an embodiment of the present invention, at least one of said one or more smart contracts is a housing club constitution, wherein said housing club constitution comprises information associated with one or more rules placed on the real estate unit, wherein said real estate unit has at least two owners.

According to an embodiment of the present invention, the method further comprises the steps of: receiving an update request from said user, wherein said update request is associated with a request to change one or more provisions in said housing club constitution; identifying one or more secondary users associated with said housing club constitution, wherein said one or more secondary users are at least partial owners of said real estate unit from said match dataset; transmitting a vote request to each of said one or more secondary users, wherein said vote request is associated with said update request; receiving one or more responses from said one or more secondary users; generating an update to said housing club constitution, based at least in part on said one or more responses from said one or more users; and recording said update to said housing club constitution in one or more of said one or more smart contracts.

According to an embodiment of the present invention, the method further comprises the steps of: executing a second change of ownership, wherein said user releases at least partial ownership in a second real estate unit; and wherein one or more of said one or more smart contracts is associated with recording a change in ownership of said second real estate unit.

According to an embodiment of the present invention, the method further comprises the step of determining whether criteria associated with said user appropriately matches one or more restrictions contained in a housing club constitution associated with said real estate unit from said match dataset.

According to an embodiment of the present invention, the method further comprises the steps of: transmitting to one or more owners of said real estate unit from said match dataset a request to permit said user to become at least partial owner of said real estate unit from said match dataset; receiving one or more responses from said one or more owners of said real estate unit from said match dataset; and determining approval of said change of ownership of said real estate unit from said match dataset, based at least in part on said one or more response from said one or more owners of said real estate unit from said match dataset.

According to an embodiment of the present invention, the method further comprises the steps of: generating a valuation analysis of said change of ownership; generating an equity analysis of said change of ownership; and generating a change in payment to be made by user, wherein said change in payment is based at least in part on said valuation analysis and said equity analysis.

According to an embodiment of the present invention, the method further comprises the step of recording said change in payment in one or more of said one or more smart contracts.

According to an embodiment of the present invention, the method further comprises the step of recording said valuation analysis and equity analysis in one or more of said one or more smart contracts.

According to an embodiment of the present invention, the method further comprises the steps of: identifying an action associated with one of said one or more smart contracts, wherein the one of said one or more smart contracts is a housing club constitution, and wherein the action is associated with said user; and generating an event based at least in part on the action and one or more rules stored in said housing club constitution.

According to an embodiment of the present invention, a computerized system for providing automated real estate ownership mobility, said computerized system comprises: a social equity module, comprising computer-executable code stored in non-volatile memory; a processor; and one or more communications means; wherein the social equity module, the processor, and the one or more communications means are configured to: receive a real estate match request; generate a match dataset, wherein said match dataset is based at least in part on information derived from said real estate match request, and wherein said match dataset comprises information associated with at least one real estate unit; transmit, via said communications means, said match dataset to a user; receive a transaction request from said user; process said transaction request, wherein said transaction request identifies a real estate unit from said match dataset; execute a change of ownership, wherein said user becomes at least partial owner of said real estate unit from said match dataset; and generate one or more smart contracts, wherein at least one of said one or more smart contracts is associated with recording a change in ownership of said real estate unit from said match dataset.

According to an embodiment of the present invention, the social equity module, the processor, and the one or more communications means are further configured: to receive an update request from said user, wherein said update request is associated with a request to change one or more provisions in said housing club constitution; identify one or more secondary users associated with said housing club constitution, wherein said one or more secondary users are at least partial owners of said real estate unit from said match dataset; transmit a vote request to each of said one or more secondary users, wherein said vote request is associated with said update request; receive one or more responses from said one or more secondary users; generate an update to said housing club constitution, based at least in part on said one or more responses from said one or more users; and record said update to said housing club constitution in one or more of said one or more smart contracts.

According to an embodiment of the present invention, the social equity module, the processor, and the one or more communications means are further configured to: execute a second change of ownership, wherein said user releases at least partial ownership in a second real estate unit; and wherein one or more of said one or more smart contracts is associated with recording a change in ownership of said second real estate unit.

According to an embodiment of the present invention, the social equity module, the processor, and the one or more communications means are further configured to determine whether criteria associated with said user appropriately matches one or more restrictions contained in a housing club constitution associated with said real estate unit from said match dataset.

According to an embodiment of the present invention, the social equity module, the processor, and the one or more communications means are further configured to: transmit to one or more owners of said real estate unit from said match dataset a request to permit said user to become at least partial owner of said real estate unit from said match dataset; receive one or more responses from said one or more owners of said real estate unit from said match dataset; and determine approval of said change of ownership of said real estate unit from said match dataset, based at least in part on said one or more response from said one or more owners of said real estate unit from said match dataset.

According to an embodiment of the present invention, the social equity module, the processor, and the one or more communications means are further configured to generate a valuation analysis of said change of ownership; generate an equity analysis of said change of ownership; and generate a change in payment to be made by user, wherein said change in payment is based at least in part on said valuation analysis and said equity analysis.

According to an embodiment of the present invention, the social equity module, the processor, and the one or more communications means are further configured to record said change in payment in one or more of said one or more smart contracts.

According to an embodiment of the present invention, the social equity module, the processor, and the one or more communications means are further configured to record said valuation analysis and equity analysis in one or more of said one or more smart contracts.

According to an embodiment of the present invention, the social equity module, the processor, and the one or more communications means are further configured to: identify an action associated with one of said one or more smart contracts, wherein the one of said one or more smart contracts is a housing club constitution, and wherein the action is associated with said user; and generate an event based at least in part on the action and one or more rules stored in said housing club constitution.

Various objects, features, aspects and advantages of the disclosed subject matter will become more apparent from the following detailed description of embodiments, along with the accompanying drawing figures in which like numerals represent like components.

DETAILED DESCRIPTION

Figure 1:
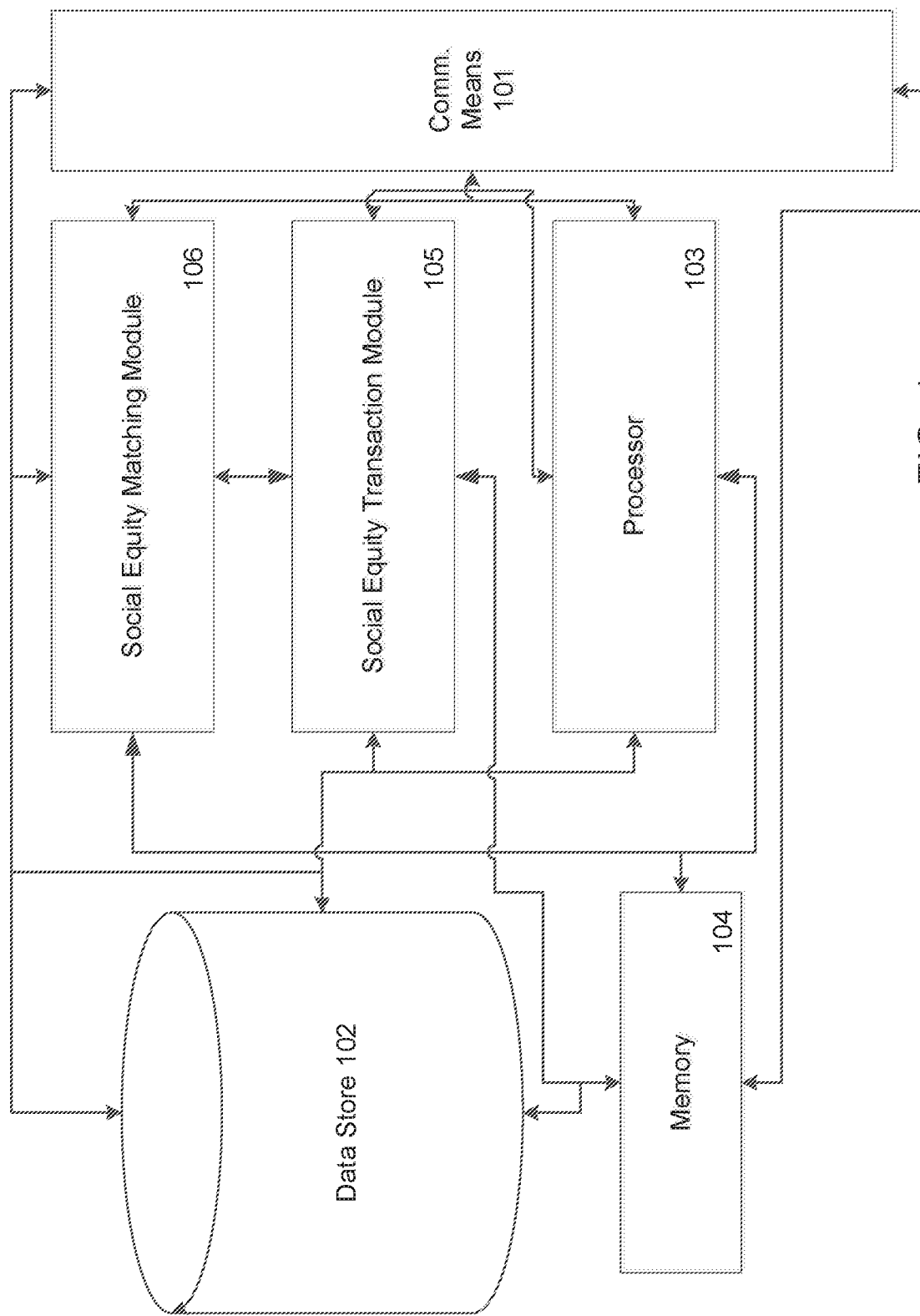
FIG. 1 is an illustration of a system for providing automated real estate ownership mobility, in accordance with an embodiment of the present invention.

The present disclosure relates to methods and systems for providing automated real estate ownership mobility. More specifically embodiments of the present invention are directed to a system and method for providing users of the system to identify, select and transact in real estate without need to execute a physical sale of the underlying real estate assets. Further, embodiments of the present invention allow for transactions in fractional, defined fractional and whole portions of a real estate units, in one, two or n-way sales.

Preferred embodiments of the present invention are partially directed at updating and altering the meaning and practical definition of residential "ownership" to meet the demands for "care free" management and extreme mobility of younger generations. Embodiments of the present invention are directed in part to enable creation of a new type of residential "MOBILE OWNERSHIP" which is more suited to younger generations of individuals.

According to an embodiment of the present invention, the system enables in both local and global ownership: extreme mobility, social management via social frameworking and a rewards and penalties gradient ethical system between users/customers ("Members"). In certain embodiments, the system is configured to automate and process legal and financial management and partial ownership of real estate units, as well as provide for "in-boarding" of full real estate units and/or swapping of parts of full real estate units for other partial real estate units, and the intelligent swapping of ownership between partial or complete real estate units. Real estate units may be comprised of one or more types of real estate property, including, but not limited to, houses, apartments, condominiums, time shares, townhouses, or combinations thereof. One of ordinary skill in the art would appreciate that there are numerous types of real estate units and embodiments of the present invention are contemplated for use with any appropriate type of real estate units. Further, while preferred embodiments of the present invention are directed primarily at residential real estate units, embodiments of the present invention could be used for other types of real estate units as well, such as commercial real estate units and retail real estate units, and embodiments of the present invention are contemplated for use with such real estate units.

According to an embodiment of the present invention, while moving around within specified rules, the system gives members the ability to accumulate equity in real estate units, even while swapping ownership of such real estate units and moving around. The system allows for members payments to be made towards paying down a mortgage on a real estate unit somewhere, while still providing mobility.

Preferred embodiments of the present invention also provide a system that enables members to be paid their pro-rata equity accretions on real properties as a mortgage gets paid down and as property's values rises over time without needing to wait for long term liquidity events to get access to their capital. This feature may be implemented, for instance, via smart contracts. In this preferred embodiment, smart contracts are computer implemented transaction protocol that automatically processes the terms of a contract/transaction. Smart contracts may be implemented, for instance via one or more distributed ledgers or replicated asset registries. One of ordinary skill in the art would appreciate that there are numerous means to implement these smart contract features, and embodiments of the present invention are contemplated for use with any appropriate means for providing and implementing these smart contact features.

In a preferred embodiment, a semi-open (permission) distributed ledger technology (DLT) system is utilized to intelligently divide ownership shares via the use of certain smart algorithms and to standardize the division of real estate units. In this manner, the system may be configured to divide ownership in any real estate unit worldwide in a fair manner. This allows the system to provide to members the ability swap real estate units (including fractional ownership thereof), and such swaps may occur via a global exchange platform. The system may leverage the DLT system or other distributed ledger (e.g., blockchain exchange) to record these transactions. In this disclosure, factional ownership of real estate units create a collective of individuals with beneficial interest in a single real estate unit (referred to herein as a MICRO-COOP).

According to an embodiment of the present invention, the system provides a new real property purchasing and swapping methodology which enables individuals who otherwise would not be eligible to purchase real estate under the current dominant global credit system. Further, since preferred embodiments, the underlying real estate units will be owned by legal entities, not individuals, "ownership" of real estate units may be made possible to individuals in places where they would not otherwise be able to own property, such as in countries that require citizenship or have other restrictions with regards to who can own property in said country.

According to an embodiment of the present invention, the computerized systems utilized to enable the methodologies detailed herein are cloud based and managed, with certain components being preferably implemented in distributed means, such as the smart contracts which would use distributed ledger means.

In a preferred embodiment, a core of the system utilizes a distributed ledger component (e.g., DLT, blockchain), "automated social frameworking" and a system and network of interlocking trusts/legal entities in creating a new type of Home Ownership Mobility which is a competitive system to today's renting/leasing residential property conventions. Greater mobility, convenience, and far better economics for the customer/resident are generally achieved. The system enables the customer/resident to recapture some, most, or some times all of their funds over time which would have otherwise been wasted rent.

In a preferred embodiment, the system enables the near instantaneous exchange of ownership title and equity benefit in a trust-less manner utilizing "social frameworks" and Distributed Ledger Technologies ("DLT") such as blockchain or Directed Acyclic Graphs ("DAG"s, such as Hashgraph.) The system, in a preferred embodiment, also enables partial ownership of a home and the exchange of "partial ownership titles" and financial benefit to the customer for pro-rata equity accretion including automated "smart contract" access to liquidity in an on-going basis.

The system in the preferred embodiment supports partial or fractional ownership of real estate units where membership in the underlying real estate unit is subject to terms of an agreement amongst its members, referred to herein as a Housing Club Constitution. Via the system, these private housing club(s) allow members to create a set of by-laws for fractionally owned real estate units which allows for members to be in control over whom they wish to associate with in their real estate units. Such private housing clubs assist in providing housing for members and wherein membership acceptance criteria is used to create a group of people who become party to an Housing Club Constitution. Such a private housing club may offer and administer member benefits, rules, rewards, and penalties and may offer activities, social or career introductions, education, arbitrations, and/or other perks. A Housing Club Constitution may require members to honor the location specific "House Rules" agreed upon by the residents of a particular apartment or house and also calls for the reward of certain agreed upon positive behavior and likewise the penalization of negative behavior. Automation of the execution such rewards and penalties associated with a Housing Club Constitution may be implemented, for instance, via smart contract or other computer implemented and regulated means provided by the system.

In certain embodiments, a Housing Club Constitution may be implemented which limits or sets forth preferred requirements for a member to join in fractional ownership of a particular real estate unit. An example case for this is the fractional ownership of a multi-bedroom unit, wherein each member will be obtaining fractional ownership in the real estate unit, wherein the fractional ownership is associated with a particular bedroom within the multi-bedroom unit. Given, in this example case, there will be multiple members sharing the common areas (e.g., bathrooms, kitchen, living room) of a multi-bedroom unit, it is desirable to have a set of rules that are commonly acceptable to the members. While the Housing Club Constitution may include certain objective rules that should be complied with, such as not leaving dishes in a sink, not smoking indoors, not having one or more forms of pets, or not having more than a certain number of overnight guests at a time, the system may be configured to allow the members to set subjective standards in the Housing Club Constitution as well.

Further, the system may be configured to allow for the House Club Constitution to have elements for setting requirements, criteria or suggestions for allowing new members to enter into the Housing Club Constitution (e.g., replace an existing member with a new member). For instance, the system may allow for the Housing Club Constitution to identify certain restrictions, criteria, preferences or suggestions on potential member's characteristics (e.g., gender, nationality, religion), traits (e.g., cleanliness, honesty, openness), or other objective or subjective data point in order to ensure the members of a private housing club to maintain a particular desired atmosphere for a real estate unit.

In conjunction with the aforementioned usage of the Housing Club Constitution, the system may be configured to utilize training models and predictive analytics to identify to members and potential members matches for real estate units that suit their own characteristics and the characteristics of real estate units to determine whether a particular member would be a good fit for a particular real estate unit. As the system has access to data points from both the member and the real estate unit, and will have an ever-increasing number of data points related to how relationships transpired (e.g., good, bad, neutral) between and amongst members, Housing Club Constitutions and/or real estate units. Ultimately, when the system has enough data points at its disposal, the system will be extremely accurate at identifying potentially sublime matches between members and real estate units.

In a preferred embodiment, "Social Frameworks", of which the House Club Constitution is one, are further supported and provided by the system in a networked structure. Ratings of individual members/users (i.e., Social ratings), financial rewards (which may be implemented in cryptocurrency and/or fiat currency) and financial fines (which may be implemented cryptocurrency and/or fiat currency) may be administered based upon social behavior, ratings, and on time or late payments—as prescribed in the House Club Constitution.

In preferred embodiments, the system employs a networked ownership platform. The networked ownership platform is configured to manage and oversee, in part, a distributed yet cooperating network of individual legal entities which are trusts or trust-like entities to hold legal title to real properties and reserve much of the beneficial title for the benefit of the members who are legally limited beneficiaries in these entities (and therefore or otherwise known as "beneficial owners" in such entities and have "beneficial ownership" in one or more of the underlying real estate units). In certain embodiments, a network or networks of trustees or managers led by a common trust services company or alternatively a network of decentralized cooperating trustees or managers utilize the system, which provides cloud management and artificial intelligence to provide services to value, maintain, or improve real properties with the focus of accreting greater value over time and assists in the enforcement of the agreed upon rules of a Housing Club Constitution when it comes to fees, fines, and occupancy rights of resident club members. These trustees or managers of individual real properties may contractually cooperate with each other in supporting resident owner swaps and management as such activity comports to both an agreed upon housing club constitution and to individual resident House Rules. While a preferred embodiment may leverage trusts and other such entities, one of ordinary skill in the art would appreciate that there are numerous corporate or other legal entities that could be utilized with embodiments of the present invention, and embodiments of the present invention are contemplated for use with any appropriate legal structure.

For clarity, when discussing ownership, or beneficial ownership, herein with respect to the change in ownership provided to users, in preferred embodiments, the actual ownership change is not a change in the ownership of the property by the legal entity, but rather change in ownership of the legal entity or a recorded ownership in the form of tokenized ownership (e.g., recording ownership on a DLT system). However, in certain embodiments, such as where laws may require it, actual ownership of the real estate unit may be transferred and recorded.

Further, in certain embodiments, ownership transactions may be conducted in numerous manners, including, but not limited to, one-way transactions, two-way transactions or n-way transactions. A one-way transaction is one where a user transacts solely with the system, such as when the user releases ownership of a real estate unit (e.g., in exchange for currency) or when a user receives ownership of a real estate unit, where the ownership of the real estate unit was vested in the system. A two-way transaction is a transaction between two users, such as when two users swap beneficial ownership of real estate units associated with those users. An n-way transaction involves three or more users (i.e., n-users), where the users are all swapping, releasing, or some combination thereof, a number of real estate units.

In still further embodiments, the system may be configured to provide for short-term changes in beneficial ownership, with an automatic roll-back of the ownership transaction after some trigger event. For instance, the system may be configured to allow for two users to swap beneficial ownership of real estate units for a short period (e.g., two weeks) to allow for each of the users to enjoy a vacation at the location of the other user's real estate unit. The trigger events for such roll-backs or other short-term change in beneficial ownership of a real estate unit may be more than just time-based as well. For instance, triggers for automatically changing beneficial ownership of a user in a real estate unit may include, but is not limited to, time, legal requirement (e.g., duration of a visa, termination of a visa), termination request by original owner of the real estate unit, or any combination thereof. One of ordinary skill in the art would appreciate that there are numerous trigger events that could eb used with embodiments of the present invention and embodiments of the present invention are contemplated for use with any appropriate trigger event.

In certain embodiments, the system may fully automate the process of maintaining and managing the associated real legal entities, maintaining and managing the real estate units, and maintaining and managing the enforcement of Housing Club Constitutions. Through a series of automated processes and artificial intelligence means, the system may be configured to automate these features, such as automatically processing administrative actions related to a trust or real estate unit (e.g., payment of mortgages, submission of taxes, generation and submission of legally required forms).

In a preferred embodiment of the present invention, the social rewards component and equity payment component of the system enable the payment of currency (e.g., fiat, crypto) to or by a member, regardless of any country in which the member or real estate unit is in, and may guarantee that the price of the currency is pegged to the national fiat currency in which the member is situated without added financial risk to either the member or the system.

The system, in at least one preferred embodiment, utilizes cloud management and AI to manage the member experience in a decentralized social housing club (or group operating with or within one or more social frameworks) across a geographically decentralized physical network of real estate units, wherein residential, cultural, and certain financial information is made available to participants joining the network.

Turning now to FIG. 1, an exemplary system for providing automated real estate ownership mobility is shown, in accordance with an embodiment of the present invention. The system comprises: one or more communications means, such as circuitry for wireless communications, circuitry for wired communications, circuitry for voice or data communications, or any other communications systems; one or more data stores 102, such as a database, file repository system, or other non-transitory storage medium; one or more processors 103, such as a central processing unit (CPU) or other specialized processing device; one or more memory devices 104, such as RAM, ROM, cache or other memory system; a social equity transaction module 105; and a social equity matching module 106.

Figure 2:
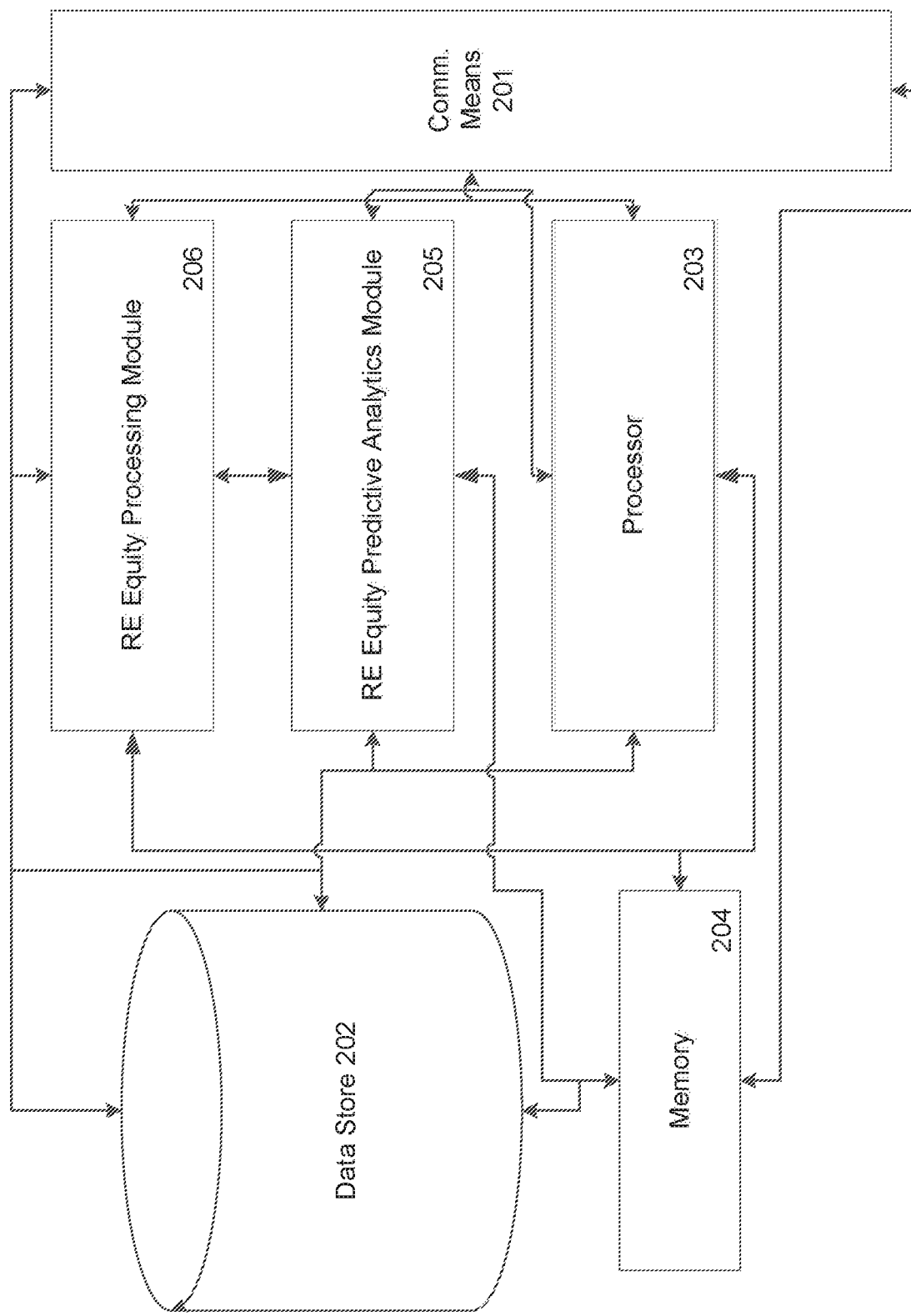
FIG. 2 is an illustration of a system for providing automated real estate ownership mobility, in accordance with an embodiment of the present invention.

Turning now to FIG. 2, an exemplary system for providing automated real estate ownership mobility is shown, in accordance with an embodiment of the present invention. The system comprises: one or more communications means, such as circuitry for wireless communications, circuitry for wired communications, circuitry for voice or data communications, or any other communications systems; one or more data stores 202, such as a database, file repository system, or other non-transitory storage medium; one or more processors 203, such as a central processing unit (CPU) or other specialized processing device; one or more memory devices 204, such as RAM, ROM, cache or other memory system; a real estate (RE) equity predictive analytics module 205; and a RE equity processing module 206.

The embodiments shown in FIGS. 1 and 2 are merely exemplary embodiments of the present invention, and one of ordinary skill in the art would appreciate that the configurations could be adapted to use additional or fewer components, or otherwise combined or modified to provide the systems and methods detailed herein. As such, each of these modified embodiments are contemplated for use with the system and methods described herein.

Further, one of ordinary skill in the art would appreciate that the system could be implemented in a variety of manners, such as locally on a computing device (e.g., smartphone), managed via a remote or distributed system and provided as a service (e.g., SaaS) layer between a contact and receiving elements of the user, or some combination thereof. As such, each of these implementations are contemplated for use with the system and methods described herein.

According to an embodiment of the present invention, the system may comprise one or more modules integrated or stored on a computer readable medium, or otherwise be accessible to a processor for instructing the processor to take various actions inline with the methods described herein. Modules may include, but are not limited to, a social equity transaction module 105, a social equity matching module 106, a real estate (RE) equity predictive analytics module 205, a RE equity processing module 206 or any combination thereof. One of ordinary skill in the art would appreciate that these modules could be implemented in various manners, and combined or further broken down into additional modules, depending on the architecture and implementation of the system.

According to an embodiment of the present invention, a social equity transaction module 105 is configured to provide the system the ability to identify, process and record transactions associated with real estate units managed by the system, wherein the transactions are between users of the system. The transactions may include, but are not limited to: generation of a housing club contract; formation of a housing club; updates to housing club contracts; termination of housing club contracts; administration of housing club contracts (e.g., updating terms, updating owners); administration of other smart contracts; administration of social rankings or ratings of various users; recordation of social transactions; and any combination thereof. In preferred embodiments, the social equity module is configured to handle processing and recording of the social aspects of the methods detailed herein. In these preferred embodiments, the social equity module leverages distributed ledgers and smart contracts to affect and record the actions conducted and transacted by the social equity module.

According to an embodiment of the present invention, a social equity matching module 106 is configured to provide matching abilities to the system. The social equity matching module leverages information available and associated with various users to generate potential successful matches for those users amongst real estate units and the users living in those real estate units. Particularly, the social equity matching module is used to determine whether a set of users would be compatible, based on criteria know about the users (e.g., social rankings/ratings, self-provided details, details provided by other users, demographics).

According to an embodiment of the present invention, a real estate (RE) equity predictive analytics module 205 is configured to work in conjunction with the social equity matching module in order to provide high quality matches to users. In preferred embodiments, the RE equity predictive analytics module may leverage predictive analytic and artificial intelligence means to make determinations based on past experiences and matches presented to the system. Advantageously, in this configuration, the system is able to provide matches that have a high probability of being successful in the long term.

According to an embodiment of the present invention, a RE equity processing module 206 is configured to generate and process transactions associated with the real estate units managed and/or administered by the system. Transactions may include, but are not limited to: change of ownership; generating fractional divisions of a whole real estate unit; generating a joining of fractions associated with a real estate unit; processing of property management requests (e.g., maintenance, safety and security); processing of administrative/governmental requests (e.g., payment of taxes, submission of administrative forms); generation of valuations of real estate units; generation of equity valuations of users; processing of payment transactions associated with users; and any combination thereof.

Figure 3:
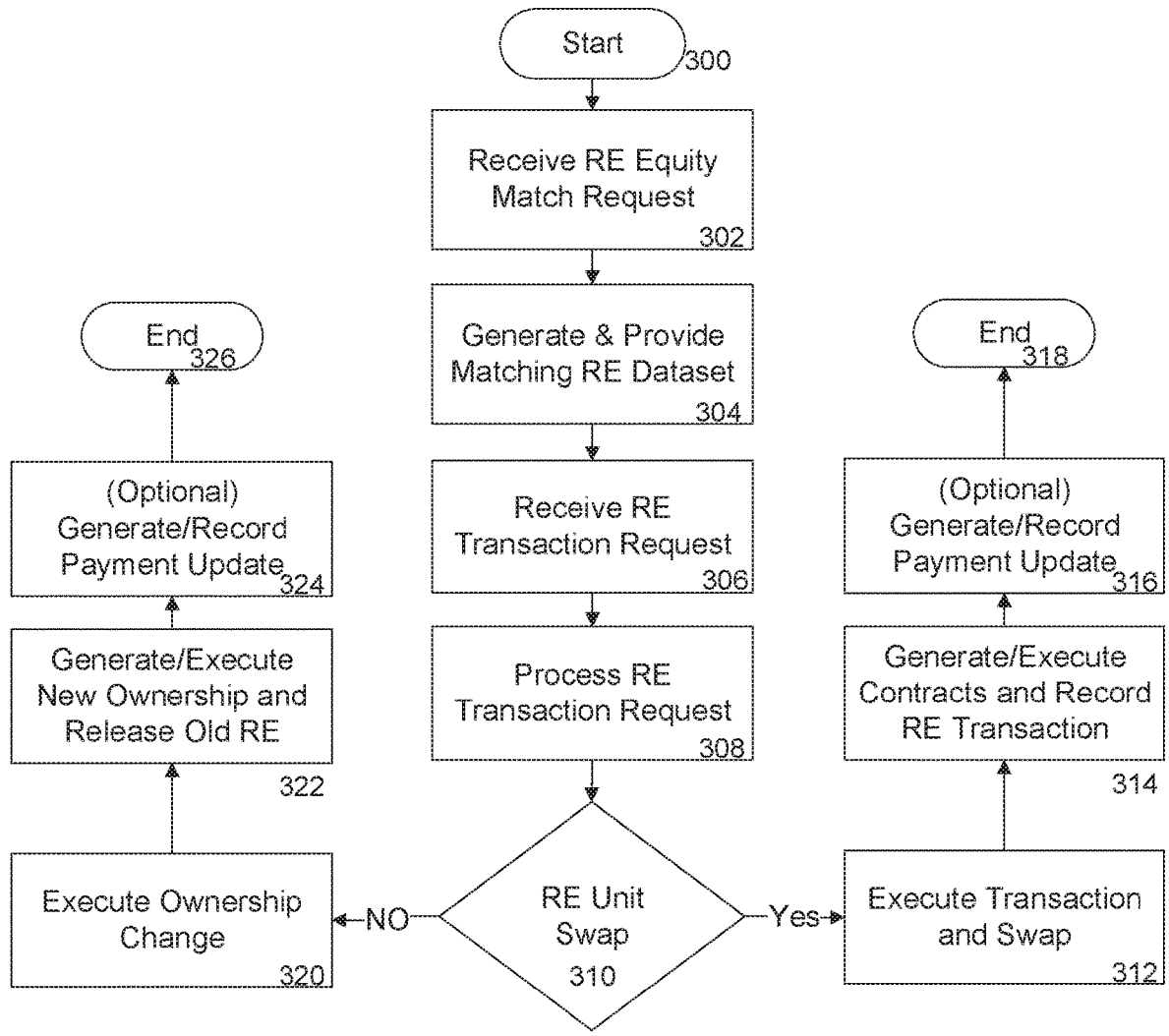
FIG. 3 is an exemplary embodiment of a method for providing automated real estate ownership mobility.

Turning now to FIG. 3, an exemplary method for conducting a real estate unit transaction, in accordance with an embodiment of the present invention, is shown. The process starts at step 300 with the system being engaged to provide a change of ownership transaction. At step 302, the system receives the request to match a user with an appropriate real estate unit. The match request may include information provided by the user in order to help guide the matching process. Match information may include, but is not limited to, location user wishes to move to (e.g., city, state, country, county), identity of a real estate unit the user wishes to release or swap, size of a real estate unit user desires, price increase or decrease from current payment, information associated with the type of private housing club the user wishes to join (if applicable), or any combination thereof. One of ordinary skill in the art would appreciate that there are numerous types of match request information that may be provided by the user, and embodiments of the present invention are contemplated for use with any appropriate type of match request information.

At step 304, the system processes the match request received and generates a dataset identifying real estate units that are close matches to the match information and criteria about the user. In certain cases, particularly where the user is requesting to enter into a fractional ownership real estate unit (e.g., private housing club), the system may be configured to remove, or otherwise ignore and not include in the dataset, real estate units where the user does not meet or otherwise match with criteria or contracts (e.g., housing club constitution) associated with that real estate unit. Once generated, the system provides the dataset to the user, generally via a user interface on a computing device associated with the user.

At step 306, the system receives a transaction request from the user, where the user has selected a real estate unit that the user wishes to own (fractionally or wholly).

At step 308, the system processes the transaction request. Processing of the transaction request may include checking to see if the matched and selected real estate unit are still available, and whether the transaction is possible, based on criteria associated with the user (e.g., income, citizenship, credit). Processing of the transaction may include sending the proposed transaction to one or more owners of the real estate unit (i.e., other fractional owners) for approval of the user as a new fractional owner. This allows the other owners to have a say in who joins their living community. Assuming that all the criteria for the transaction are met and approved, the process continues to the next step.

If the transaction is approved, the system determines whether the transaction involves swapping a current real estate unit associated with the user, or if the transaction is not tethered to another real estate unit (step 310).

If the transaction is a swap, the process proceeds to step 312, where the swap transaction is executed. In certain cases, the swap transaction may be a direct swap between two users of the system, with one user taking the real estate unit of the other and vice versa. In other embodiments, the swap may involve the user obtaining the new real estate unit, while the real estate unit previously held by the user is released into a general pool of unassigned real estate units. These unassigned real estate units are managed by the system and provided for matching at any time with new or existing users. In this manner, the system can provide liquidity in an otherwise non-liquid real estate market.

In still further embodiments, the system may be configured to provide an n-way swap. In an N-way swap, the system transacts in a 2 or 3 or more (i.e., N) way swap of real estate units. In this method, N number of real estate units are swapped at the same time. For instance, users A, B, C and D start with real estate units 1, 2, 3 and 4 respectively (A→1, B→2, C→3, D→4), and via a single N-way swap executed by the system could result in any other ownership combination, such as A→2, B→4, C→1 and D→3. This could occur when there are numerous users attempting to conduct ownership swaps at the same or around the same time, allowing for greater flexibility and exchange of ownership in the underlying real estate units.

At step 314, the system has executed the transaction and swap and generates/updates and executes smart contracts associated with the transaction and swap. This may involve generating/updating and recording smart contracts associated with the ownership of the real estate unit as well as updating or generating a housing club constitution associated with the real estate unit, binding the user to the rules of the housing club constitution. The system may further be configured to reverse the transaction at this point if the user fails to execute the smart contracts associated with the real estate unit (e.g., housing club constitution). In certain cases, the system may be configured to administer an evaluation process between the owners of a real estate unit when a new user comes into a fractionally owned real estate unit, wherein the owners (including the user) evaluate and update the housing club constitution.

At step 316, the system may be optionally configured to generate and record changes to the payments to be made by the user in association with the transaction. For instance, if the transaction includes the user going to a more expensive real estate unit, the payment may be increased (or the reverse if the new real estate unit is less expensive). At this point the process would terminate at step 318.

Returning to where the transaction does not include a swap request, the system may move straight to executing the ownership change in the real estate unit (step 320). One completed, the system sets about generating and executing smart contracts associated with the transaction. In this case, the system is recording new ownership for the user, as well as releasing ownership from a separate user, who may be either entering into their own swap into another real estate unit, or being released from ownership and having their equity cashed out for other financial consideration (e.g., fiat currency, cryptocurrency). Similar to the process associated with swaps, this may involve generating/updating and recording smart contracts associated with the ownership of the real estate unit as well as updating or generating a housing club constitution associated with the real estate unit, binding the user to the rules of the housing club constitution. The system may further be configured to reverse the transaction at this point if the user fails to execute the smart contracts associated with the real estate unit (e.g., housing club constitution). In certain cases, the system may be configured to administer an evaluation process between the owners of a real estate unit when a new user comes into a fractionally owned real estate unit, wherein the owners (including the user) evaluate and update the housing club constitution.

At step 324, the system may be optionally configured to generate and record changes to the payments to be made by the user in association with the transaction. For instance, if the transaction includes the user going to a more expensive real estate unit, the payment may be increased (or the reverse if the new real estate unit is less expensive). At this point the process would terminate at step 326.

Figure 4:
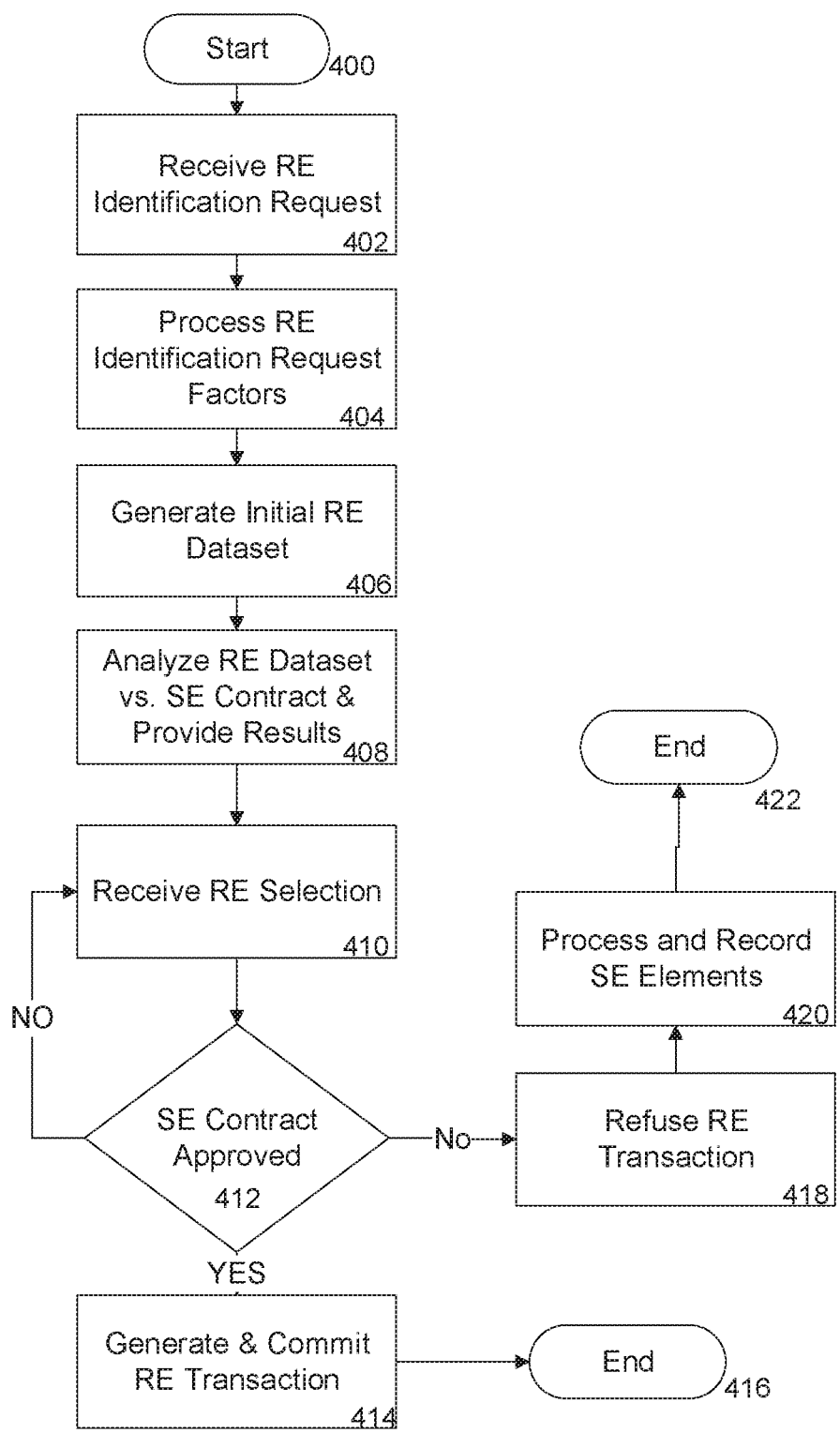
FIG. 4 is an exemplary embodiment of a method for providing automated real estate ownership mobility.

Turning now to FIG. 4, an exemplary and detailed method for a real estate unit transaction involving a social equity contract (e.g., housing club constitution), in accordance with an embodiment of the present invention, is shown. The process starts at step 400 with the system being engaged to identify real estate units for a transaction. At step 402, the system receives the request to identify real estate units for a user. The identification request may include information provided by the user in order to help guide the matching process. Match information may include, but is not limited to, location user wishes to move to (e.g., city, state, country, county), identity of a real estate unit the user wishes to release or swap, size of a real estate unit user desires, price increase or decrease from current payment, information associated with the type of private housing club the user wishes to join (if applicable), or any combination thereof. One of ordinary skill in the art would appreciate that there are numerous types of match request information that may be provided by the user, and embodiments of the present invention are contemplated for use with any appropriate type of match request information.

At step 404, the system processes the identification requests and factors associated with the request. In this scenario, the user is identifying more than just basic criteria for a real estate unit. The user is also providing information about the nature and type of community the user wants to join, via fractional ownership of a real estate unit with others. In this embodiment, the user can identify criteria that the user is interested in matching with (e.g., cleanliness of the others, openness of the others, demographics, nationality, gender, languages spoken, diversity). These criteria, as can be seen, can be either objective, such as languages spoken, or subjective, such as cleanliness. For subjective criteria, the system can use various data points to determine the appropriate level for each. These data points may include, but are not limited to, self-reporting by the user, social rankings/ratings given by other users, other information provided to the system, or any combination thereof.

At step 406, the system uses the processed request factors to generate a dataset of appropriate real estate units that fit the user's request. In certain embodiments, the system will also leverage predictive analytics based on training data, or other artificial intelligence means, to ensure the highest probability of success for the real estate units identified in the dataset. In other embodiments, simpler straightforward matching means and weighted variables can be utilized (e.g., more heavily weighting certain preferences over others). In certain embodiments, the user may also identify and provide weights for certain variables (e.g., user strongly prefers to live with only women, users strongly dislikes living with smokers).

At step 408, the system analyzes the identified real estate unit dataset against smart social equity contracts (e.g., housing club constitution) associated with the various real estate units. This analysis by the system is to ensure that the real estate units provided to the user in the dataset are ones where the user matches the criteria of the social equity contracts associated with those real estate units. The system may exclude or remove real estate units from the dataset where the user would be a clear no fit or low probability fit for a particular real estate unit, based on the criteria associated with the social equity contracts. Once completed, the system transmits the dataset to the user, generally via a graphical user interface on a computing device associated with the user.

At step 410, the system receives a selection of a real estate unit by the user. The selection identifies that the user is interested in conducting a transaction for the particular real estate unit. At this point, the system notes the selection and sends the potential transaction to the other users associated with the real estate unit for approval (i.e., other fractional owners). The other users will take a vote on the allowance of the potential transaction. In certain instance, this may also involve the system connecting the user with the other users in order to discuss the potential transaction and to see whether the user is a fit for the real estate unit. It should be noted that in certain embodiments, no vote is conducted, and the system determines that the potential transaction should be approved based on the available criteria and data available to the system.

At determination step 412, if the potential transaction is approved, the system sets about recording and executing the transaction at step 414. The recordation and execution process is set forth in exemplary detail above in the method shown in FIG. 3. At this point, the process terminates at step 416.

If the potential transaction is disapproved, then the system may revert to the user the option to select a different real estate unit from the dataset (back to Step 410). Otherwise, in certain embodiments, the system may also refuse the transaction at step 418.

The system may further process and record information associated with the transaction for further use at step 420. This may include, but is not limited to, processing and recording any comments or rationale for refusing the transaction received from the other users, processing and recording criteria associated with the user and other users for use in predictive analytic means in the future, processing and recording particular elements in a social equity contract that the user failed to meet, or any combination thereof. Ultimately, all of these data points are useful in future predictions as to whether a particular user would be a good fit with any particular social equity match. At this point the process terminates at step 422.

Throughout this disclosure, numerous references are made to servers, services, interfaces, engines, modules, clients, peers, portals, platforms, or other systems formed from computing devices. It should be appreciated that the use of such terms is deemed to represent one or more computing devices having comprising one or more processors (e.g., ASIC, FPGA, DSP, x86, ARM, ColdFire, GPU, multi-core processors) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions.

One of ordinary skill in the art would further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network. The terms "configured to" and "programmed to" in the context of a processor refer to being programmed by a set of software instructions to perform a function or set of functions.

While the inventive subject matter is susceptible of various modification and alternative embodiments, certain illustrated embodiments thereof are shown in the drawings and will be described below in detail. It should be understood, however, that there is no intention to limit the invention to the specific form disclosed, but on the contrary, the invention is to cover all modifications, alternative embodiments, and equivalents falling within the scope of the claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In some embodiments, the numbers expressing quantities or ranges, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified, thus fulfilling the written description of all Markush groups used in the appended claims.

What is claimed is:

1. A computerized method for providing automated real estate ownership mobility, said computerized method using a social equity module, a processor and a communications means, the method comprising the steps of:

receiving a real estate match request;

generating a match dataset, wherein said match dataset is based at least in part on information derived from said real estate match request, and wherein said match dataset comprises information associated with at least one real estate unit;

transmitting, via said communications means, said match dataset to a user;

receiving a transaction request from said user;

processing said transaction request, wherein said transaction request identifies a real estate unit from said match dataset;

executing a change in beneficial ownership, wherein said user becomes at least partial beneficial owner of said real estate unit from said match dataset;

generating one or more smart contracts, wherein at least one of said one or more smart contracts is associated with recording a change in ownership of said real estate unit from said match dataset, wherein at least one of said one or more smart contracts is a housing club constitution, wherein said housing club constitution comprises information associated with one or more rules placed on the real estate unit, wherein said real estate unit has at least two owners;

receiving an update request from said user, wherein said update request is associated with a request to change one or more provisions in said housing club constitution;

identifying one or more secondary users associated with said housing club constitution, wherein said one or more secondary users are at least partial owners of said real estate unit from said match dataset;

transmitting a vote request to each of said one or more secondary users, wherein said vote request is associated with said update request;

receiving one or more responses from said one or more secondary users;

generating an update to said housing club constitution, based at least in part on said one or more responses from said one or more users; and recording said update to said housing club constitution in one or more of said one or more smart contracts.

2. The method of claim 1, further comprising the steps of:

executing a second change of beneficial ownership, wherein said user releases at least partial beneficial ownership in a second real estate unit; and wherein one or more of said one or more smart contracts is associated with recording a change in beneficial ownership of said second real estate unit.

3. The method of claim 1, further comprising the step of determining whether criteria associated with said user appropriately matches one or more restrictions contained in a housing club constitution associated with said real estate unit from said match dataset.

4. The method of claim 3, further comprising the steps of:

transmitting to one or more owners of said real estate unit from said match dataset a request to permit said user to become at least partial owner of said real estate unit from said match dataset;

receiving one or more responses from said one or more owners of said real estate unit from said match dataset; and determining approval of said change of beneficial ownership of said real estate unit from said match dataset, based at least in part on said one or more response from said one or more owners of said real estate unit from said match dataset.

5. The method of claim 1, further comprising the steps of:

generating a valuation analysis of said change of beneficial ownership;

generating an equity analysis of said change of beneficial ownership; and generating a change in payment to be made by user, wherein said change in payment is based at least in part on said valuation analysis and said equity analysis.

6. The method of claim 5, further comprising the step of recording said change in payment in one or more of said one or more smart contracts.

7. The method of claim 5, further comprising the step of recording said valuation analysis and equity analysis in one or more of said one or more smart contracts.

8. The method of claim 1, further comprising the steps of:

identifying an action associated with one of said one or more smart contracts, wherein the one of said one or more smart contracts is a housing club constitution, and wherein the action is associated with said user; and generating an event based at least in part on the action and one or more rules stored in said housing club constitution.

9. A computerized system for providing automated real estate ownership mobility, said computerized system comprising:

a social equity module, comprising computer-executable code stored in non-volatile memory;

a processor; and one or more communications means;

wherein the social equity module, the processor, and the one or more communications means are configured to:

receive a real estate match request;

generate a match dataset, wherein said match dataset is based at least in part on information derived from said real estate match request, and wherein said match dataset comprises information associated with at least one real estate unit;

transmit, via said communications means, said match dataset to a user, receive a transaction request from said user, process said transaction request, wherein said transaction request identifies a real estate unit from said match dataset;

execute a change of beneficial ownership, wherein said user becomes at least partial owner of said real estate unit from said match dataset;

generate one or more smart contracts, wherein at least one of said one or more smart contracts is associated with recording a change in beneficial ownership of said real estate unit from said match dataset;

execute a second change of beneficial ownership, wherein said user releases at least partial beneficial ownership in a second real estate unit, wherein one or more of said one or more smart contracts is associated with recording a change in beneficial ownership of said second real estate unit.

10. The system of claim 9, wherein at least one of said one or more smart contracts is a housing club constitution, wherein said housing club constitution comprises information associated with one or more rules placed on the real estate unit, wherein said real estate unit has at least two owners.

11. The system of claim 10, wherein the social equity module, the processor, and the one or more communications means are further configured to:

receive an update request from said user, wherein said update request is associated with a request to change one or more provisions in said housing club constitution;

identify one or more secondary users associated with said housing club constitution, wherein said one or more secondary users are at least partial owners of said real estate unit from said match dataset;

transmit a vote request to each of said one or more secondary users, wherein said vote request is associated with said update request;

receive one or more responses from said one or more secondary users;

generate an update to said housing club constitution, based at least in part on said one or more responses from said one or more users; and record said update to said housing club constitution in one or more of said one or more smart contracts.

12. The system of claim 9, wherein the social equity module, the processor, and the one or more communications means are further configured to determine whether criteria associated with said user appropriately matches one or more restrictions contained in a housing club constitution associated with said real estate unit from said match dataset.

13. The system of claim 12, wherein the social equity module, the processor, and the one or more communications means are further configured to:

transmit to one or more owners of said real estate unit from said match dataset a request to permit said user to become at least partial owner of said real estate unit from said match dataset;

receive one or more responses from said one or more owners of said real estate unit from said match dataset; and determine approval of said change of beneficial ownership of said real estate unit from said match dataset, based at least in part on said one or more response from said one or more owners of said real estate unit from said match dataset.

14. The system of claim 9, wherein the social equity module, the processor, and the one or more communications means are further configured to:
   generate a valuation analysis of said change of beneficial ownership;
   generate an equity analysis of said change of beneficial ownership; and
   generate a change in payment to be made by user, wherein said change in payment is based at least in part on said valuation analysis and said equity analysis.

15. The system of claim 14, wherein the social equity module, the processor, and the one or more communications means are further configured to record said change in payment in one or more of said one or more smart contracts.

16. The system of claim 14, wherein the social equity module, the processor, and the one or more communications means are further configured to record said valuation analysis and equity analysis in one or more of said one or more smart contracts.

17. The system of claim 9, wherein the social equity module, the processor, and the one or more communications means are further configured to:
   identify an action associated with one of said one or more smart contracts,
   wherein the one of said one or more smart contracts is a housing club constitution, and
   wherein the action is associated with said user; and
   generate an event based at least in part on the action and one or more rules stored in said housing club constitution.

* * * * *